US012724986B2

(12) United States Patent
Kim et al.

(10) Patent No.: US 12,724,986 B2
(45) Date of Patent: Sep. 1, 2026

(54) METHODS, SYSTEMS, AND NON-TRANSITORY COMPUTER-READABLE RECORD MEDIA TO PROVIDE TRANSLATION RESULT OF CONVERSATION MESSAGE

(71) Applicant: LINE Plus Corporation, Seongnam-si (KR)

(72) Inventors: Donghyun Kim, Seongnam-si (KR); Hoyoung Cho, Seongnam-si (KR); Sung Ho Park, Seongnam-si (KR)

(73) Assignee: LINE Plus Corporation, Gyeonggi-do (KR)

( * ) Notice: Subject to any disclaimer, the term of this patent is extended or adjusted under 35 U.S.C. 154(b) by 260 days.

(21) Appl. No.: 17/713,680

(22) Filed: Apr. 5, 2022

(65) Prior Publication Data

US 2022/0327293 A1 Oct. 13, 2022

(30) Foreign Application Priority Data

Apr. 7, 2021 (KR) ........................ 10-2021-0045443

(51) Int. Cl.
*G06F 40/58* (2020.01)
*G06F 40/166* (2020.01)
(Continued)

(52) U.S. Cl.
CPC ............ *G06F 40/58* (2020.01); *G06F 40/166* (2020.01); *G06F 40/263* (2020.01); *H04L 51/48* (2022.05)

(58) Field of Classification Search
CPC ...... G06F 40/58; G06F 40/166; G06F 40/263; G06F 40/103; G06F 40/42; H04L 51/48;
(Continued)

(56) References Cited

U.S. PATENT DOCUMENTS 11,030,421 B2 * 6/2021 Tanaka .................... G06F 40/47
11,221,751 B2 * 1/2022 Chaudhri ........... G06F 3/04883
(Continued)

FOREIGN PATENT DOCUMENTS

JP 2022-041432 A 2/2002
JP 2013-140584 A 7/2013
(Continued)

OTHER PUBLICATIONS

Japanese Office Action issued Feb. 3, 2026 in Japanese Patent Application No. 2022-049002.
(Continued)

*Primary Examiner* — Pierre Louis Desir
*Assistant Examiner* — Kristen Michelle Masters
(74) *Attorney, Agent, or Firm* — Harness, Dickey & Pierce, P.L.C.

(57) ABSTRACT

A message processing method performed by a computer system comprising at least one processor, the at least one processor being configured to execute computer-readable instructions included in a memory, the message processing method including recognizing, by the at least one processor, a language related to a conversation space based on a conversation context and a translation-related option to obtain a recognized language, the translation-related option being set for the conversation space, and providing, by the at least one processor, at least one translated text according to the recognized language for a message in the conversation space.

18 Claims, 15 Drawing Sheets

(51) Int. Cl.

| | |
|---|---|
| ***G06F 40/263*** | (2020.01) |
| ***H04L 41/04*** | (2022.01) |
| ***H04L 51/063*** | (2022.01) |
| ***H04L 51/48*** | (2022.01) |

(58) Field of Classification Search

CPC ....... H04L 51/04; H04L 51/063; H04L 51/02; H04L 51/046; H04L 51/046704; G10L 15/005

See application file for complete search history.

(56) References Cited

U.S. PATENT DOCUMENTS

| | | | | |
|---|---|---|---|---|
| 2012/0078609 | A1* | 3/2012 | Chaturvedi ............ | G06F 40/58 704/3 |
| 2019/0205397 | A1 | 7/2019 | Tanaka et al. | |

FOREIGN PATENT DOCUMENTS

| | | | |
|---|---|---|---|
| JP | 2014-510965 | A | 5/2014 |
| JP | 2018-502399 | A | 1/2018 |
| JP | 2018-163657 | A | 10/2018 |
| JP | 6538966 | B2 | 9/2019 |
| KR | 10-2002-0074304 | A | 9/2002 |
| KR | 10-2012-0092488 | A | 8/2012 |
| KR | 10-2015-0104051 | A | 9/2015 |
| KR | 10-2018-0108973 | A | 10/2018 |
| KR | 10-2018-0133936 | A | 12/2018 |
| WO | 2018/134878 | A1 | 7/2018 |

OTHER PUBLICATIONS

Korean Office Action issued Apr. 22, 2026 in Korean Patent Application No. 10-2021-0045443.

* cited by examiner

METHODS, SYSTEMS, AND NON-TRANSITORY COMPUTER-READABLE RECORD MEDIA TO PROVIDE TRANSLATION RESULT OF CONVERSATION MESSAGE

CROSS-REFERENCE TO RELATED APPLICATION(S)

This U.S. non-provisional application claims the benefit of priority under 35 U.S.C. § 119 to Korean Patent Application No. 10-2021-0045443, filed Apr. 7, 2021, the entire contents of which are incorporated herein by reference in their entirety.

BACKGROUND

Technical Field

Some example embodiments relate to technology for providing a translation result of a conversation message.

Related Art

An instant messenger that is one of general community tools refers to software capable of sending and receiving messages or data in real time, and may allow a user to register a contact on a messenger and to send and receive messages with a counterpart included in a contact list.

Such a messenger function allows the use of a messenger to be popular not only in a personal computer (PC) environment but also in a mobile environment of a mobile communication terminal.

For example, a mobile messenger service system and method of a portable terminal using a wireless communication network for providing a messenger service between mobile messengers installed on portable terminals have been developed.

SUMMARY

Some example embodiments may involve recognizing a user language and a language of an incoming message and providing a translated text of the corresponding message in a conversation space according to the recognized language.

Some example embodiments may involve combining an original text and a translated text of a corresponding message and displaying the original text and the translated text through a single message user interface (UI) for each message.

Some example embodiments may involve displaying a translated text of an incoming message only for a user without delivering the translated text to a sender.

Some example embodiments may involve displaying a translated text of an incoming message as an inline view according to a user request (on-demand).

Some example embodiments may provide a function capable of immediately or promptly sending a translated text by providing a translated text of a message input to a message input box of a conversation space.

According to an aspect of some example embodiments, there is provided a message processing method performed by a computer system comprising at least one processor, the at least one processor being configured to execute computer-readable instructions included in a memory, the message processing method including recognizing, by the at least one processor, a language related to a conversation space based on a conversation context and a translation-related option to obtain a recognized language, the translation-related option being set for the conversation space, and providing, by the at least one processor, at least one translated text according to the recognized language for a message in the conversation space.

The recognizing may include recognizing a user language used by a user of the computer system in the conversation space, and recognizing at least one recognition target language corresponding to the translation-related option among languages of incoming messages.

The at least one translated text may be a result of translation of an incoming message into at least one language, the at least one language may include a first language used by a user of the computer system, and the providing may include providing the at least one translated text based on a second language of the incoming message being different from the first language.

The providing may include displaying a combination of an original text of an incoming message and the at least one translated text on the conversation space through a single speech bubble interface.

The displaying may include displaying a display element for identifying at least one of the original text or the translated text, the display element distinguishing the original text and the at least one translated text.

The displaying may include displaying a manipulation interface, the manipulation interface being configured to manipulate at least one of the original text or the at least one translated text through at least one of delete, correct or hide processing.

The providing may include displaying a speech bubble interface including an original text of the message on the conversation space, the message being received in the conversation space, and adding the at least one translated text of the message to the speech bubble interface in response to a user request such that the at least one translated text is displayed as a single message with the original text.

The at least one translated text may be displayed by the computer system without being sent to another user included in the conversation space.

The message processing method may include obtaining the at least one translated text from a translation-only bot or a server, the translation-only bot being included in the conversation space, the server being related to the conversation space, and the at least one translated text being included as additional information of the incoming message or including an identifier of the incoming message.

The message processing method may include generating the at least one translated text using a translation library included in a local database of the computer system.

The providing may include providing a result of translation into the recognized language for the message based on the message being input to a message input box of the conversation space by a user of the computer system, and sending the result of translation to another user included in the conversation space in response to a message send request from the user without sending the message input to the message input box.

According to an aspect of some example embodiments, there is provided a non-transitory computer-readable record medium storing instructions that, when executed by at least one processor, cause a computer system including the at least one processor to implement the message processing method.

According to an aspect of some example embodiments, there is provided a computer system including at least one processor configured to execute computer-readable instructions included in a memory to cause the computer system to recognize a language related to a conversation space based on a conversation context and a translation-related option to obtain a recognized language, the translation-related option being set for the conversation space, and provide at least one translated text according to the recognized language for a message in the conversation space.

Further areas of applicability will become apparent from the description provided herein. The description and specific examples in this summary are intended for purposes of illustration only and are not intended to limit the scope of the present disclosure.

DETAILED DESCRIPTION

Figure 1:
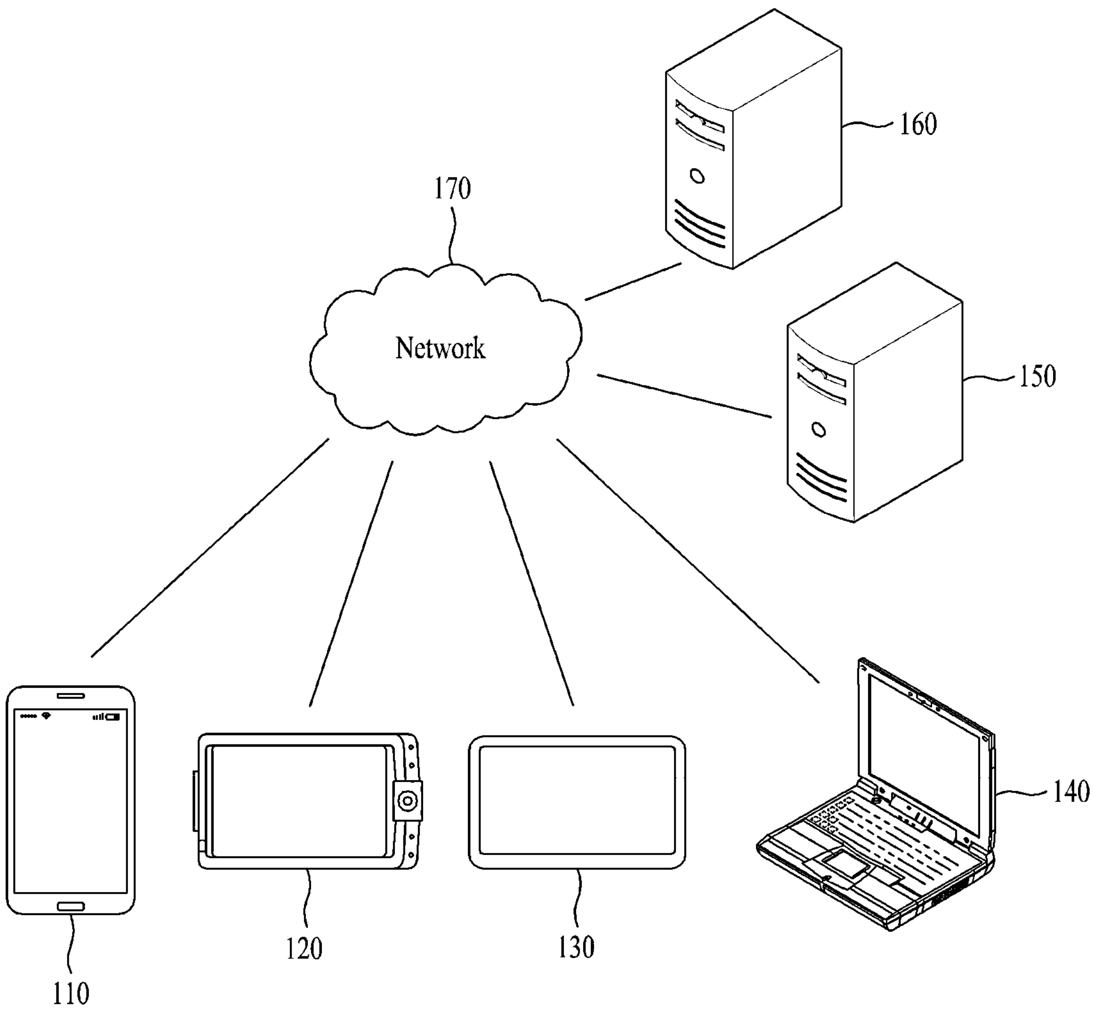
FIG. 1 is a diagram illustrating an example of a network environment according to some example embodiments.

Some example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, some example embodiments may provide for one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Some example embodiments including disclosures herein may involve recognizing a user language and a language of an incoming message, and providing a translated text of the corresponding message in a conversation space according to the recognized language and, through this, may achieve many advantages in various aspects, such as user convenience, conversation efficiency, quality of service (QoS), and the like.

FIG. 1 illustrates an example of a network environment according to some example embodiments. Referring to FIG. 1, the network environment may include a plurality of electronic devices 110, 120, 130, and/or 140, a plurality of servers 150 and 160, and/or a network 170. FIG. 1 is provided as an example only. The number of electronic devices and/or the number of servers is not limited thereto.

Each of the plurality of electronic devices 110, 120, 130, and/or 140 may be a fixed terminal or a mobile terminal that is configured as a computer system. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and/or 140, and/or the servers 150 and 160, over the network 170 in a wireless and/or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and the like. However, these are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a first service to the plurality of electronic devices 110, 120, 130, and/or 140 connected over the network 170, and the server 160 may be a system that provides a second service to the plurality of electronic devices 110, 120, 130, and/or 140 connected over the network 170. For example, the server 150 may provide, as the first service, a service (e.g., a messaging service, etc.) desired by a corresponding application through the application as a computer program that is installed and runs on the plurality of electronic devices 110, 120, 130, and/or 140. As another example, the server 160 may provide, as the second service, a service for distributing a file for installing and running the application to the plurality of electronic devices 110, 120, 130, and/or 140.

Figure 2:
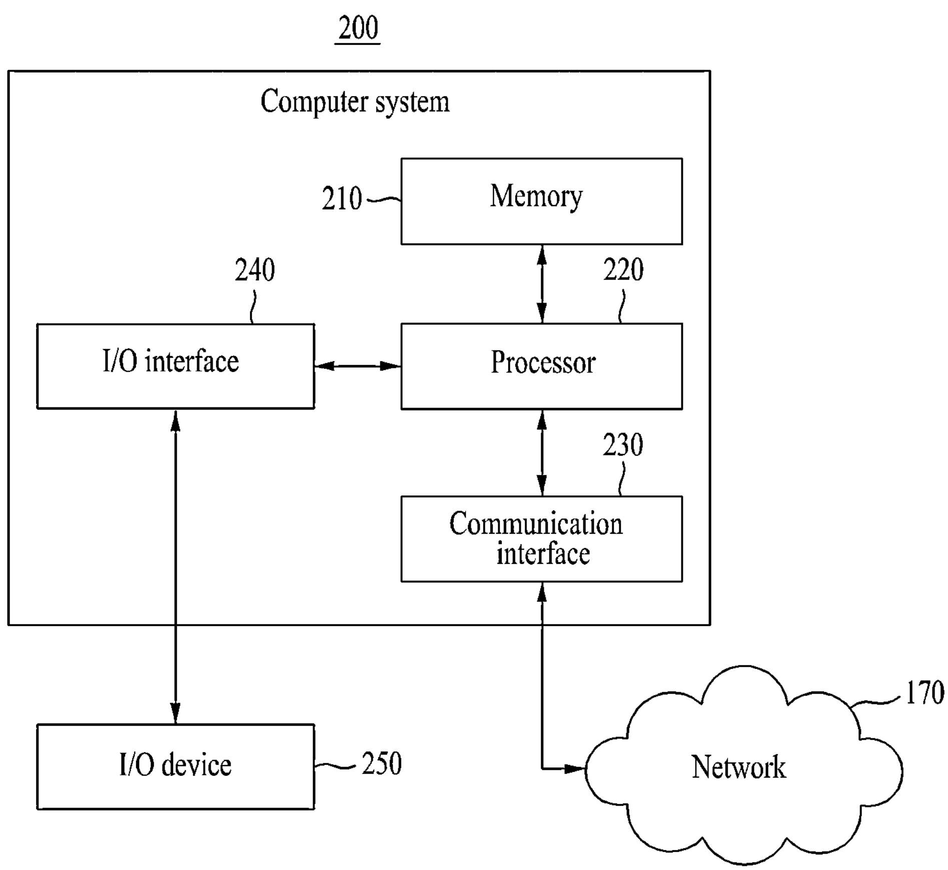
FIG. 2 is a diagram illustrating an example of a computer system according to some example embodiments.

FIG. 2 is a block diagram illustrating an example of a computer system according to some example embodiments. Each of the plurality of electronic devices 110, 120, 130, and/or 140, and/or each of the servers 150 and/or 160, may be implemented by a computer system 200 of FIG. 2.

Referring to FIG. 2, the computer system 200 may include a memory 210, a processor 220, a communication interface 230, and/or an input/output (I/O) interface 240. The memory 210 may include a permanent mass storage device, such as a random access memory (RAM), a read only memory (ROM), and/or a disk drive, as a non-transitory computer-readable record medium. The permanent mass storage device, such as ROM and a disk drive, may be included in the computer system 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include, for example, a floppy drive, a disk, a tape, a DVD/CD-ROM drive, a memory card, etc. According to some example embodiments, software components may be loaded to the memory 210 through the communication interface 230, instead of the non-transitory computer-readable record medium. For example, the software components may be loaded to the memory 210 of the computer system 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the computer system 200 and another apparatus, for example, the aforementioned storage devices. For example, the processor 220 of the computer system 200 may forward a request or an instruction created based on a program code stored in the storage device such as the memory 210, data, and/or a file, to other apparatuses over the network 170 under control of the communication interface 230. Inversely, a signal, an instruction, data, a file, etc., from another apparatus may be received at the computer system 200 through the communication interface 230 of the computer system 200. For example, a signal, an instruction, data, etc., received through the communication interface 230 may be forwarded to the processor 220 or the memory 210, and a file, etc., may be stored in a storage medium, for example, the permanent storage device, further includable in the computer system 200.

The I/O interface 240 may be a device used for interfacing with an I/O device 250 (e.g., an input device and/or an output device). For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer system 200.

Also, according to some example embodiments, the computer system 200 may include a greater or smaller number of components than the number of components of FIG. 2. However, some conventional components may not be illustrated in detail. For example, the computer system 200 may be configured to include at least a portion of the I/O device 250 or may further include other components, such as a transceiver and/or a database.

Hereinafter, some example embodiments of a method and system for providing a conversation message translation result are described.

Some example embodiments relate to technology that may provide a translated text of a conversation message in a conversation space.

Herein, the conversation space may inclusively represent all the communication spaces, for example, a chatroom of a messenger, community channels of various social network services (SNSs), and the like. For example, the conversation space may include a chatroom that allows individual users to chat through a friend addition process using a phone number, an ID, and the like, openchat that allows an immediate or prompt chat through a link, for example, a uniform resource locator (URL), without a friend addition process, a chatroom including an official account in the form of a bot that provides various types of services or contents, and the like. However, these are provided as examples only and the conversation space may expand to any space in which people with a common interest or environment may communicate through various communication functions, for example, chats, postings, posts, notes, and/or comments. Hereinafter, description is made using a conversation space of a messenger as an example.

Figure 3:
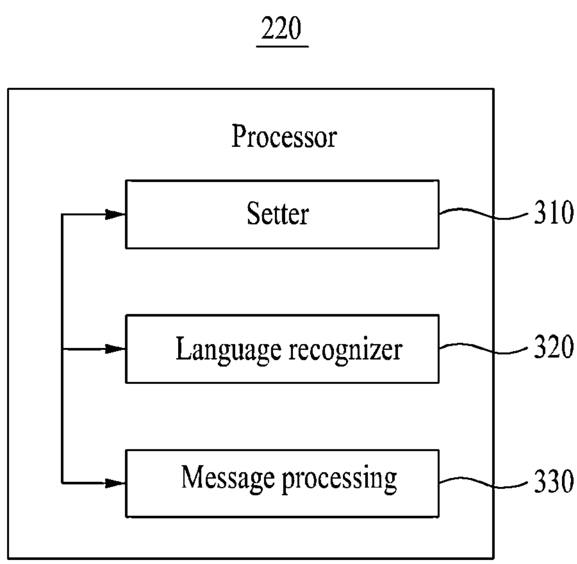
FIG. 3 is a diagram illustrating an example of a component includable by a processor of a computer system according to some example embodiments.
Figure 4:
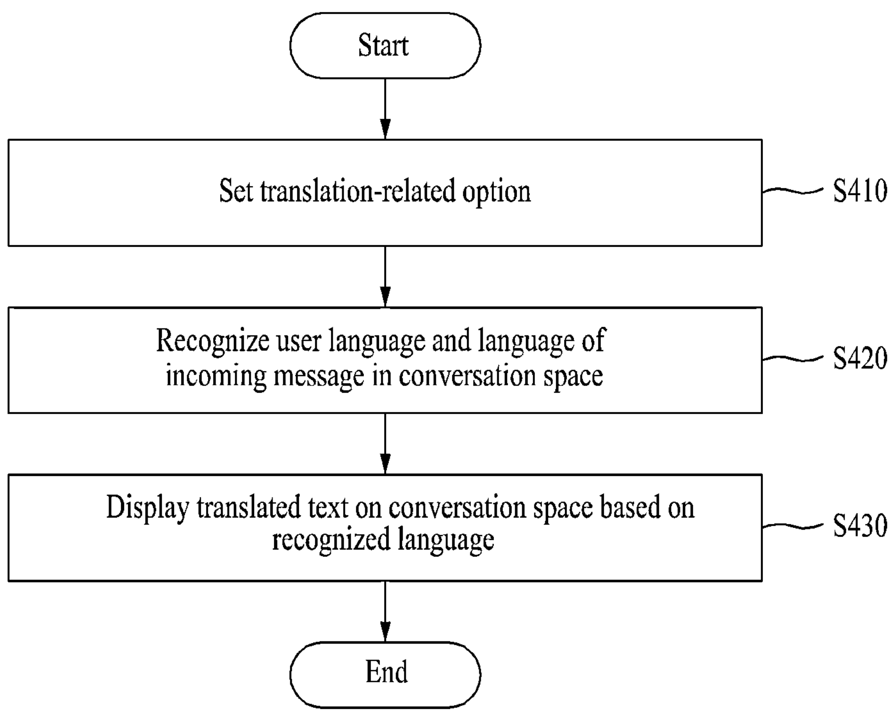
FIG. 4 is a flowchart illustrating an example of a message processing method performed by a computer system according to some example embodiments.

FIG. 3 is a diagram illustrating an example of a component included in a processor of a computer system according to some example embodiments. FIG. 4 is a flowchart illustrating an example of a method performed by a computer system according to some example embodiments.

A computer-implemented message processing system may be configured in the computer system 200 according to some example embodiments. For example, the message processing system may be implemented in the form of a program that independently operates or may be configured in an in-app form of a specific application to run on the specific application.

The message processing system implemented in the computer system 200 may perform the message processing method of FIG. 4 in response to a command provided from an application installed in the computer system 200.

Referring to FIG. 3, to perform the message processing method of FIG. 4, the processor 220 of the computer system 200 may include a setter 310, a language recognizer 320, and/or a message processing 330. Depending on some example embodiments, the components of the processor 220 may be selectively included in or excluded from the processor 220. Also, depending on some example embodiments, the components of the processor 220 may be separate or merged as representations of functions of the processor 220.

The processor 220 and the components of the processor 220 may control the computer system 200 to perform operations 5410 to 5430 included in the following message processing method of FIG. 4. For example, the processor 220 and the components of the processor 220 may be configured to execute an instruction according to a code of at least one program and/or a code of an OS included in the memory 210.

Here, the components of the processor 220 may be representations of different functions performed by the processor 220 in response to an instruction (e.g., an instruction provided from the application running on the computer system 200) provided from the program code stored in the computer system 200 (e.g., in the memory 210). For example, the setter 310 may be used as a representation of a function of the processor 220 that controls the computer system 200 to set a translation-related option in response to the aforementioned instruction.

The processor 220 may read an instruction from the memory 210 to which instructions associated with control of the computer system 200 are loaded. In this case, the read instruction may include an instruction for controlling the processor 220 to perform the following operations 5410 to 5430.

Referring to FIG. 4, in operation 5410, a setter 310 may set a translation-related option for a conversation space. For example, the setter 310 may set a language recognition option as one of a plurality of translation-related options. The language recognition option relates to setting a recognition target language, and may include an automatic language recognition option capable of providing a message translation by recognizing all the languages used in the conversation space and a designated language recognition option capable of providing a message translation by selectively recognizing only a language designated by a user. That is, the automatic language recognition option may provide a translated text in a user language for incoming messages of a language used by the user (hereinafter, referred to as a user language) and/or all other languages, and the designated language recognition option may provide a translated text in the user language or a user-designated language only for an incoming message in the user-designated language. The user language refers to a language generally used by the user in a messenger and may correspond to a result automatically recognized from a conversation context or a language directly set by the user, or may be acquired from language information set by the messenger or a terminal. The setter 310 may set an application range for the translation-related option. For example, the translation-related option may be classified using an overall setting method commonly applied to all the conversation spaces on the messenger and an individual setting method capable of setting a translation-related option for each conversation space. When an option applied as a whole setting option and an option applied as an individual setting option in a single conversation space are present, the individual setting option may be provided as a default option.

In operation 5420, the language recognizer 320 may recognize the user language and a language of an incoming message (hereinafter, referred to as an incoming language) in the conversation space. For example, the language recognizer 320 may recognize the user language and/or at least one incoming language from a context included in the conversation space. Here, the language recognizer 320 may recognize the user language and the incoming language based on the translation-related option set by the user. For example, the language recognizer 320 may select and recognize a language designated by the user from among incoming languages. As described above, a client side on which the messenger is installed may directly recognize an incoming language based on a context of an incoming message and/or may recognize the incoming language through a language code included in the incoming message depending on some example embodiments. A client of a message sending side may add a language code corresponding to a language of a message to the corresponding message and send the same. According to some example embodiments, a messenger server (e.g., the server 150) may recognize a language of a message in a process of sending the message between clients, and then add a recognized language code to the corresponding message and send the same to a client. Here, an entity that adds the language code to the message may be determined based on an entity that performs a translation. For example, when the server 150 provides a translation, the server 150 may add a language code to a message and send the same. When a client directly performs a translation, the client may not use the language code or a client of a message sending side may add the language code to a message and send the same.

In operation 5430, the message processing 330 may display a translation result on the corresponding conversation space based on the language recognized in operation 5420 for the message in the conversation space. When the user language and the incoming language differ in the conversation space, the message processing 330 may provide a translated text of the message on the corresponding conversation space. Here, the translated text of the message may include a result of translation into a single language or at least two languages. The message processing 330 may provide a message translated text for a recognition target language set as the translation-related option by the user. For example, the message processing 330 may combine and display a translated text in which an original text of an incoming message is translated in the user language into a single message unit, that is, a single speech bubble interface into which the translated text is combined with the corresponding original text. As another example, when a user request is received after initially displaying an original text of an incoming message, the message processing 330 may combine a translated text of the corresponding message with the original text and may display the same through a single speech bubble interface.

An exclusive bot included in the conversation space may provide a translated text of a message through interaction with a translation platform. According to some example embodiments, when the server 150 provides a translation function, the server 150 may directly translate a message and may send the translated text in the process of sending the message between clients. The bot or the server 150 may classify a translated text of a corresponding message for each language and may selectively send a translation result only to a user that desires the translation result (e.g., based on a user request for the translation result, user settings of the messenger, the language of the user being different from that of the corresponding message, etc.) according to each language. Instead of providing the translated text of the message to all users included in the conversation space, the translated text of the message may be sent to a user that uses a language different from a language of the original text of the message and/or to a user that sets the language of the original text of the message as a language to be recognized, that is, a recognition target language. Depending on some example embodiments, when a library used for a translation is constructed as a local database on a client for each language, a client side may provide a translated text of a message through an offline translation according to a translation-related option set by the user without intervention of the bot or the server 150. Likewise, since an offline translated text is combined with an original text of a message in the client and thereby displayed without being sent to a counterpart in the conversation space, only the user that provides translation result may view the translated text.

A translated text of an incoming message may include a result of translation into a language designated by the user as well as a result of translation into the user language. For example, if a Korean-speaking user receives a message written in Japanese, a corresponding incoming message may be provided with a text translated in Korean or with a text translated in English that is a language designated by the user in addition to the text translated in Korean.

Also, when the user inputs a message into a message input box of the conversation space, the message processing 330 may provide a translated text in which the input message is translated in at least one incoming (and/or outgoing) language. The translated text of the input message may also be provided from a dedicated bot included in the conversation space or the server 150, or may be acquired through an offline translation of a client. According to some example embodiments, the only messages the dedicated bot may provide to the conversation space may be message translations (e.g., a translation-only bot). The message processing 330 may display the translated text of the input image on an area adjacent to a message input box in a state in which an original text of the input message is input to the message input box. That is, in response to an input of a message to be sent through the conversation space, the message processing 330 provides a function of automatically displaying a translation result of the input message and sending a translated message instead of sending the input message. Here, when providing the translation result of the input message, the message processing 330 may provide an edit function capable of correcting, deleting, and/or adding to the translation result.

The translated text of the input message may include a result of translation into a language used by a conversation partner, that is, an incoming (and/or outgoing) language and may also include a result of translation into a language designated by the user. For example, when a Korean-speaking user converses with a Japanese-speaking user, the message processing 330 may provide a result of translating a message input in Korean into Japanese. Here, if English is pre-designated as an additional language by the user (or the conversation partner), the message processing 330 may provide a result of translating the message into English. Also, when a Korean, Japanese, and English-speaking user is participating in the conversation space and here, a Korean-speaking user inputs a message, the message processing 330 may provide texts that are translated in Japanese and English. According to some example embodiments, the message processing 330 may provide a text translated in a language of a most recent received message between Japanese and English or in a language of a message specified through a mention or reply function.

FIGS. 5 to 8 illustrate examples of a message translation process according to some example embodiments.

FIGS. 5 to 8 illustrate examples of a process in which a user B sends a message to a user A with the assumption that a client A 501 is a terminal of the user A speaking Korean and a client B 502 is a terminal of the user B speaking Japanese. The server 150 may manage language information and translation-related option information of each of the user A and the user B for a conversation space in which the user A and the user B participate. According to some example embodiments, each of the client A 501 and the client B 502 may be implemented using the computer system 200.

Figure 5:
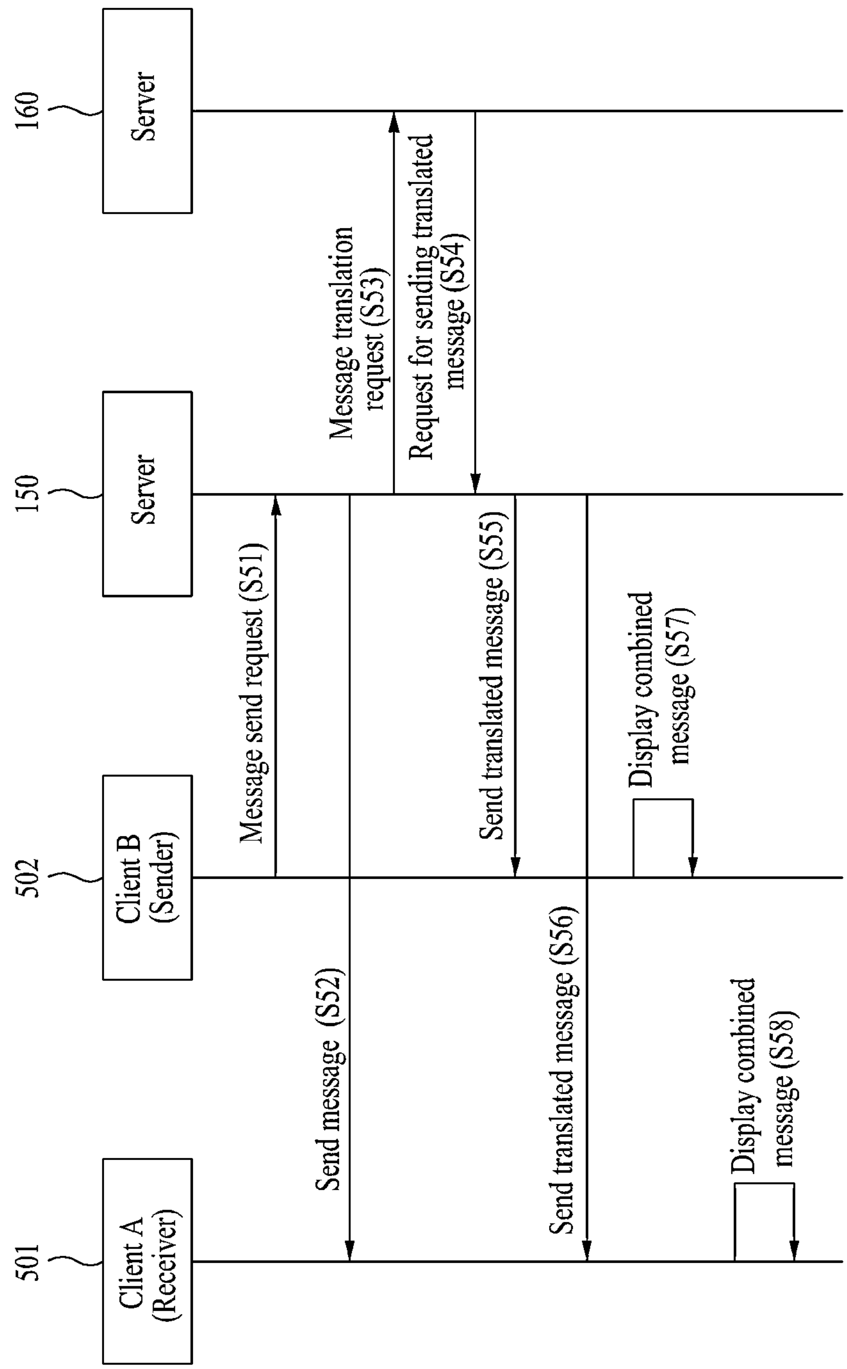
FIG. 5 illustrates an example of a message translation process according to some example embodiments.

FIG. 5 illustrates an example of a message translation process according to some example embodiments.

Referring to FIG. 5, when the user B sends a message written in Japanese in the conversation space in which the user A and the user B participate, the client B 502 delivers a message send request for sending the corresponding message to the server 150 (S51).

In response to the message send request from the client B 502, the server 150 delivers the message received from the client B 502 to the terminal of the user A participating in the conversation space, that is, the client A 501 (S52).

The server 150 may request another server, for example, the server 160 for message translation based on language information and option information of the user A to translate the message received from the client B 502 into at least one language (S53). For example, the server 150 may request translation of the message written in Japanese into the language of the user A (e.g., Korean).

In response to the request from the server 150, the server 160 may translate the message received from the client B 502 and then, when the translation is completed, may request the server 150 to send the translated message (S54). According to some example embodiments, the request may include the translated message.

The server 150 may deliver the translated message received from the server 160 to the client A 501 and the client B 502 (S55 and S56). That is, the server 150 may deliver, to the client A 501 and the client B 502, text that is translated in Korean according to an original text of the message in Japanese sent from the user B.

When displaying the message sent from the user B in the corresponding conversation space, the client A 501 and the client B 502 may each combine the original message and the translated message, that is, may combine the original text in Japanese and the translated text in Korean and may display the same through a single speech bubble interface (S57 and S58).

Depending on some example embodiments, when the client B 502 internally determines that a translation result should not be provided based on language information and option information of the user B, a process (S57) of combining the original text and the translated text and displaying the same may be omitted although the translated message is received. For example, the client B 502 may discard the translated message received from the server 150 according to information (e.g., language information and/or operation information) of the user B.

As another example, the server 150 may provide a translated text only to a user that uses a language different from a language of an incoming message among users that participate in the conversation space. For example, when a user C speaking Japanese is participating in the conversation space with the user A and the user B, the server 150 may provide the text translated in Korean only to the user A without sending the translated text to the user B and the user C that speak Japanese.

The server 150 may deliver each of the original text and the translated text of the message at an individual point in time (e.g., different points in time) or at the same point in time (or contemporaneously). When the message translation is completed after initially delivering the original text of the message, the server 150 may include an identifier of the message corresponding to the original text in the translated text and thereby deliver the same. Here, a client may initially display the original text in the conversation space and, when the translated text is received, may verify the message corresponding to the original text through the identifier included in the translated text, and may combine and thereby display the translated message and the corresponding message. As another example, the server 150 may delay sending of the original text of the message and may simultaneously (or contemporaneously) deliver the original text and the translated text at a point in time at which the message translation is completed. Here, the server 150 may include and deliver the translated text as additional information of the original text of the message.

When the server 150 itself supports the message translation, a corresponding process may be performed that is similar to the aforementioned process. Here, instead of the server 160 being dedicated for translation, the server 150 may directly provide the translation result to the client.

Figure 6:
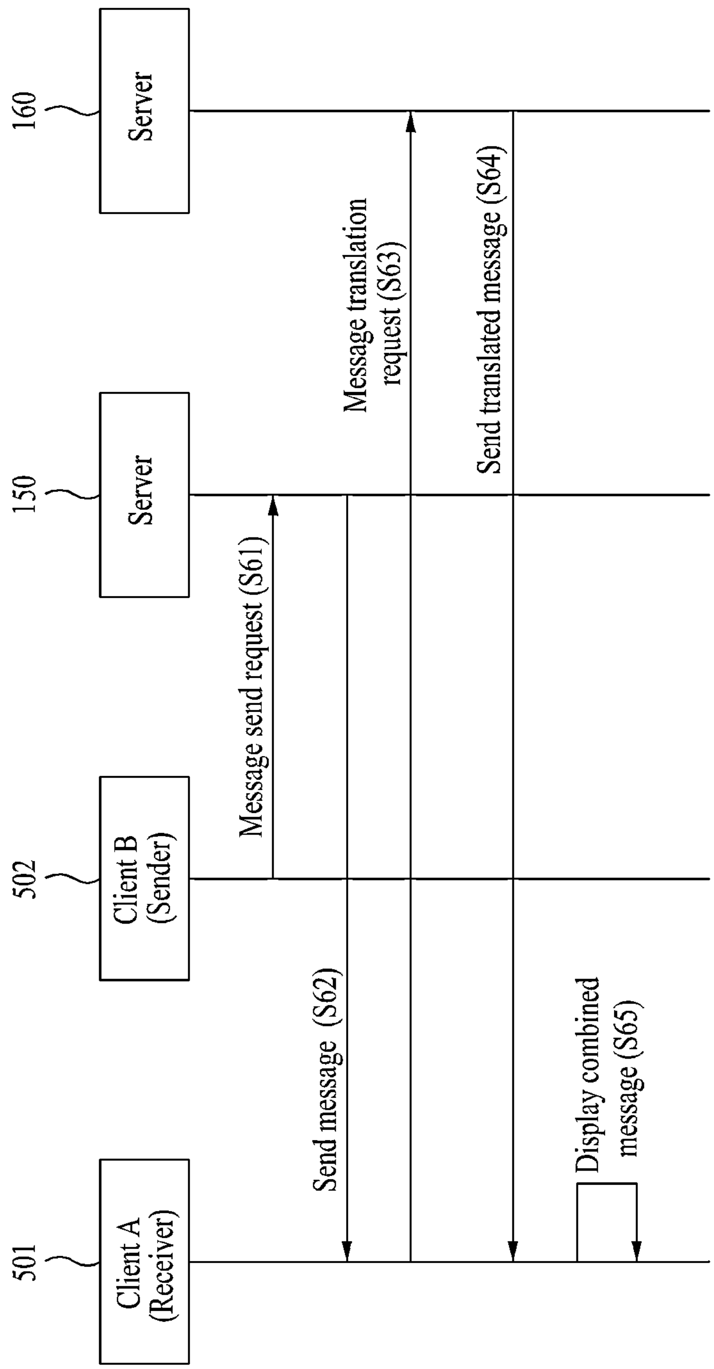
FIG. 6 illustrates another example of a message translation process according to some example embodiments.

FIG. 6 illustrates another example of a message translation process according to some example embodiments.

Referring to FIG. 6, when the user B sends a message written in Japanese in the conversation space in which the user A and the user B participate, the client B 502 delivers a message send request for sending the corresponding message to the server 150 (S61).

In response to the message send request from the client B 502, the server 150 delivers the message received from the client B 502 to the terminal of the user A participating in the conversation space, that is, the client A 501 (S62).

When the client A 501 determines that translation of the message sent from the client B 502 should be performed based on information (e.g., language information and/or translation-related option information) of the user A, the client A 501 may request the server 160 for translation into at least one language (e.g., Korean) (S63).

In response to the request from the client A 501, the server 160 may translate the message received from the client B 502 to the client A 501 and, when translation is completed, may deliver the translated message to the client A 501 (S64).

When displaying the message sent from the user B in the corresponding conversation space, the client A 501 may combine the original message and the translated message, that is, may combine the original text in Japanese and the text translated in Korean and thereby display the same through a single speech bubble interface (S65).

Similar to the client A 501, the client B 502 may also determine whether the message translation should be performed based on information (e.g., language information and/or option information) of the user B and, here, when it is determined that a translation result should not be performed, the client B 502 does not perform a message translation process.

That is, each client that receives the message may determine whether the message translation should be performed, that is, whether the message should be translated and, when a corresponding user speaks a language different from that of a counterpart, may individually perform a message translation process (e.g., with the server 160) and may provide a translation result only to a user of the client performing the message translation process.

Figure 7:
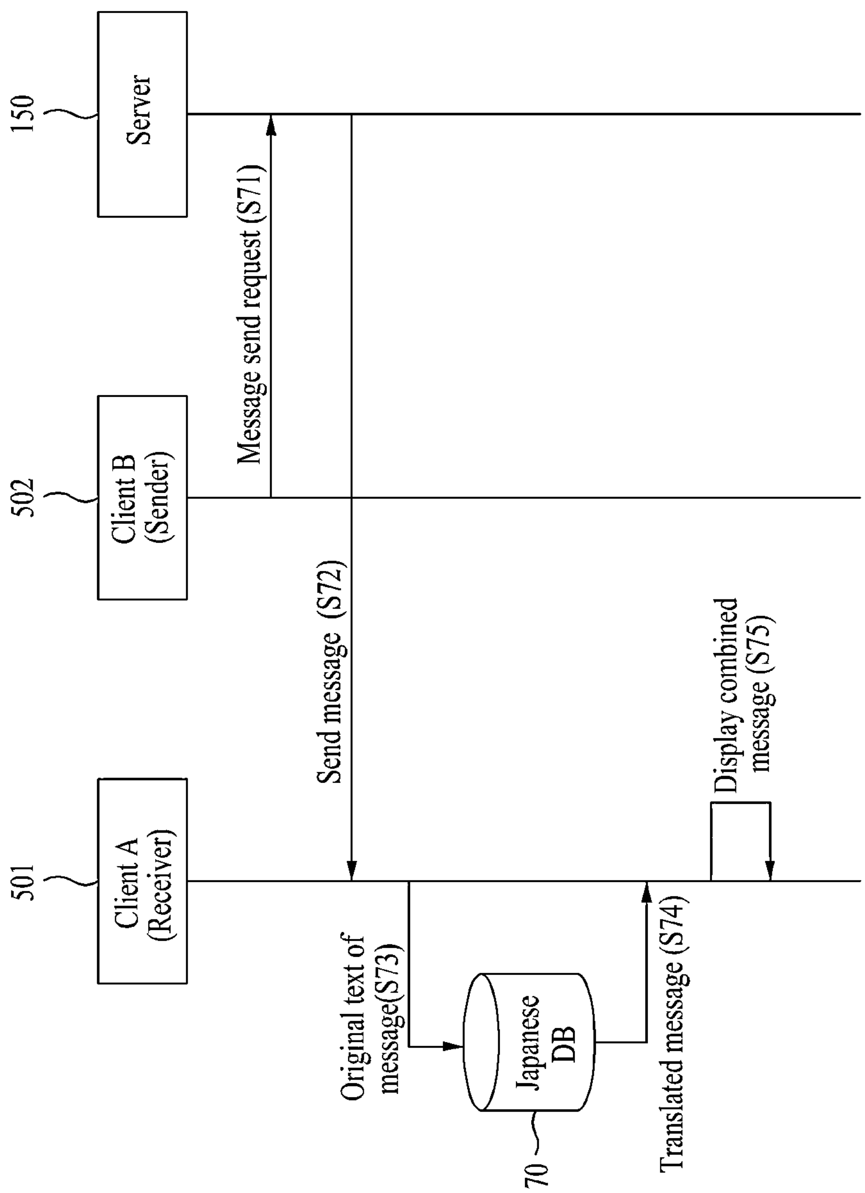
FIG. 7 illustrates still another example of a message translation process according to some example embodiments.

FIG. 7 illustrates still another example of a message translation process according to some example embodiments.

Referring to FIG. 7, when the user B sends a message written in Japanese in the conversation space in which the user A and the user B participate, the client B 502 delivers a message send request for sending the corresponding message to the server 150 (S71).

In response to the message send request from the client B 502, the server 150 delivers the message received from the client B 502 to the terminal of the user A participating in the conversation space, that is, the client A 501 (S72).

The client A 501 may translate the message sent from the client B 502 into at least one language based on language information and translation-related option information of the user A (S73 and S74). The client A 501 may construct a Japanese database (DB) 70 (e.g., stored in the memory 210) including a translation library between Korean and Japanese as a local database and may translate an original text of the message written in Japanese into the language of the user A, that, Korean using the Japanese DB 70.

The client A 501 itself may translate the message received from the client B 502 through an offline translation using the Japanese DB 70, and may display the original text and the translated text through a single speech bubble interface (S75). That is, when displaying the message sent from the user B in the corresponding conversation space, the client A 501 may combine the original message and the translated message, that is, may combine the original text in Japanese and the text translated in Korean and thereby display the same through a single speech bubble interface.

Therefore, each client that receives the message may determine whether the message translation should be performed, that is, whether the message should be translated and, when a corresponding user speaks a language different from that of a counterpart, may provide a translation result only to a user of the client through a self-translation.

Figure 8:
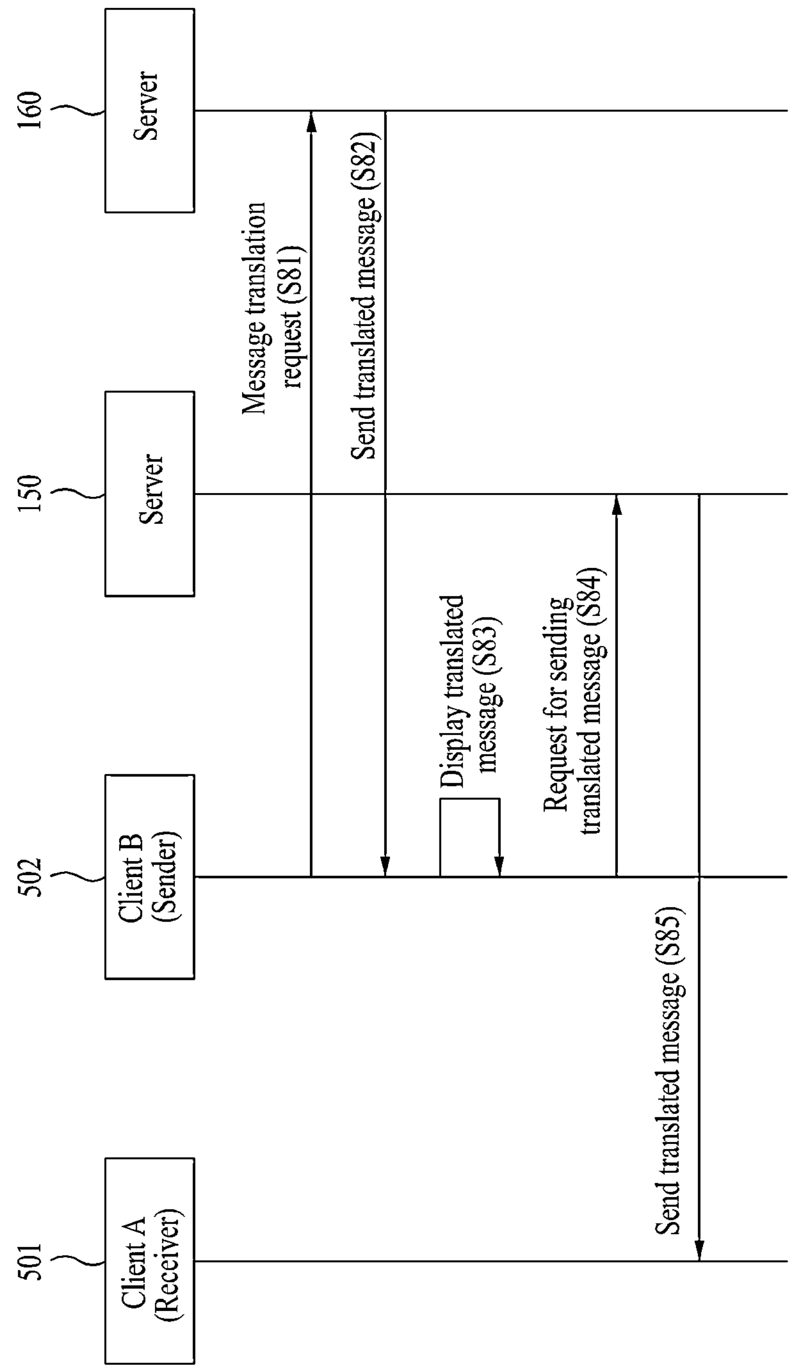
FIG. 8 illustrates still another example of a message translation process according to some example embodiments.

FIG. 8 illustrates still another example of a message translation process according to some example embodiments.

Dissimilar from a process in which translation proceeds after an original text of a message is sent as in FIGS. 5 to 7, FIG. 8 illustrates an example of a flow of a function capable of sending a translated message by initially performing a translation in a message input process.

Referring to FIG. 8, when the user B inputs a message to be sent to the user A in the conversation space in which the user A and the user B participate, the client B 502 may deliver a request for translating the message to the server 160 with the message input from the user B (S81).

In response to the request from the client B 502, the server 160 may translate the message received from the client B 502 and, when the translation is completed, may deliver the translated message to the client B 502 (S82).

The client B 502 may receive the translated message from the server 160 for the message input from the user B and may display the translated message in the corresponding conversation space (S83).

In response to a request from the user B, the client B 502 delivers a message send request, for sending the translated message received from the server 160, to the server 150 (S84).

In response to the message send request from the client B 502, the server 150 delivers the translated message received from the client B 502 to the terminal of the user A participating in the conversation space, that is, the client A 501 (S85).

Therefore, in response to an input of a message to the conversation space, each client may automatically display a translation result and immediately (or promptly) send not an original text of the message but a translated message.

When a translation library is constructed as a local database on a client side, some example embodiments may also provide a translation of an input message through an offline translation using an internal database instead of using the server 160.

FIGS. 9 to 15 illustrate examples of an interface screen for displaying a message translation result according to some example embodiments.

FIGS. 9 to 15 illustrate examples of a screen on which a user A speaking Korean converses with a user B speaking Japanese.

In the following, a situation in which the user B sends a message 'お疲れ様でした' to the user A is assumed.

Figure 9:
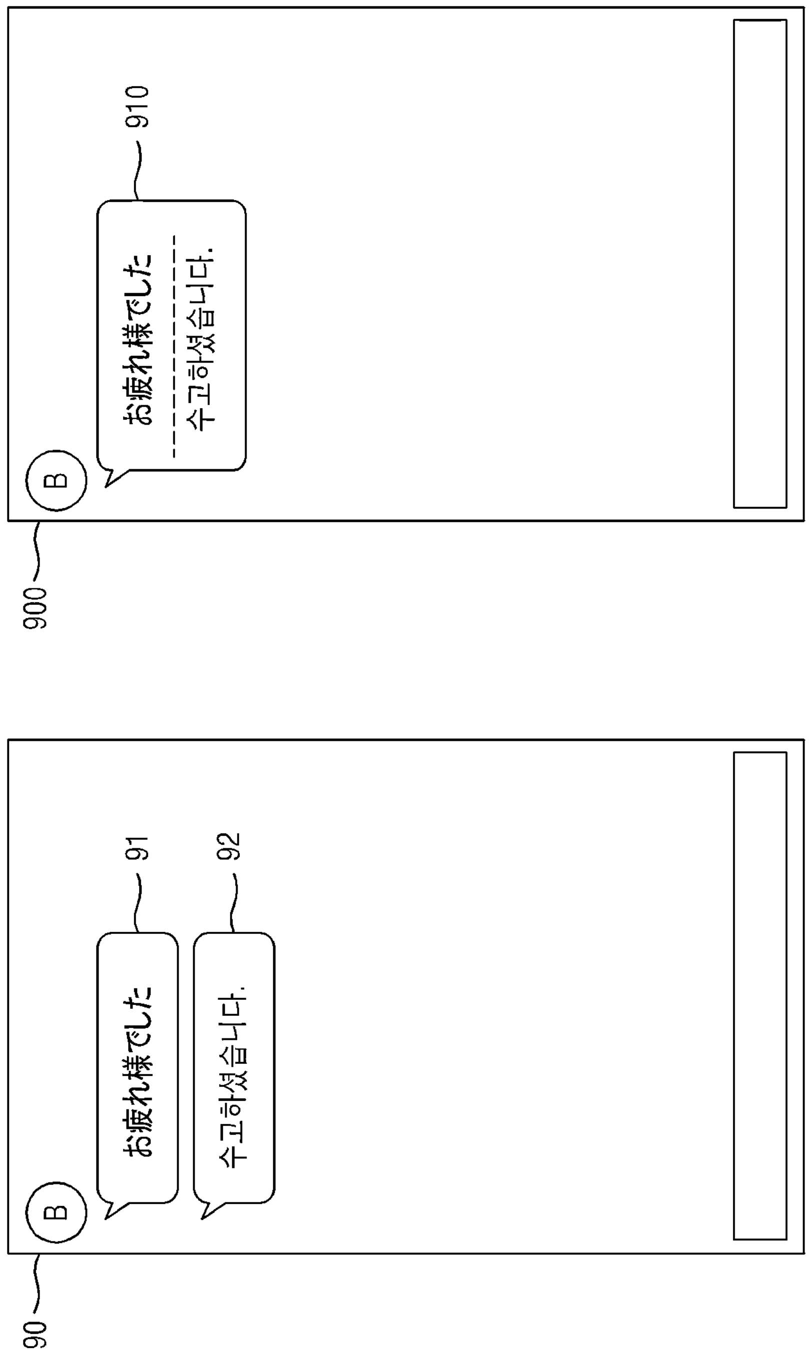
FIGS. 9 to 15 illustrate examples of an interface screen for displaying a message translation result according to some example embodiments.

Referring to FIG. 9, conventional devices for performing a process of displaying a message, such as, displaying an original text 'お疲れ様でした' of the message and a text '수고하셨습니다' translated from the message 'お疲れ様でした' in Korean on a conversation space 90 display the messages through separate speech bubble interfaces 91 and 92 when a time difference occurs between sending, receiving and/or display the original text of the message and the translated text of the message, which may cause a disturbance in conversation context and may make it difficult to verify a relationship between messages in terms of user experience (UX). For example, the above challenges of the conventional devices may result in communication failure of an original message and/or translated text due to excessive ambiguity regarding associations between, ordering of, etc., of the respective messages.

As illustrated in FIG. 9, however, some example embodiments provide improved devices for performing a process of displaying a message. For example, the message processing 330 may combine the original text 'お疲れ様でした' of the message and the translated text '수고하셨습니다' of the message and may display the same through a single speech bubble interface 910 on a conversation space 900. The association between the original text and translated text may be determined based on, for example, an identifier of an original message (containing the original text). Accordingly, the association may be determined regardless of a time difference between sending, receiving and/or display the original text of the message and the translated text of the message. The original text and translated text may be displayed based on the association. For example, the message processing 330 may display the original text of the message and the translated text of the message through the single speech bubble interface 910 (rather than separate speech bubble interfaces as by the conventional devices), and thereby provide UX with a clear relationship between messages in the conversation space 900 to support natural conversation context. Accordingly, the improved devices overcome the deficiencies of the conventional devices to remove or reduce the ambiguity regarding associations between, ordering of, etc., of the respective messages to at least prevent communication failure (or reduce the frequency of occurrence thereof) of an original message and/or translated text.

Figure 10:
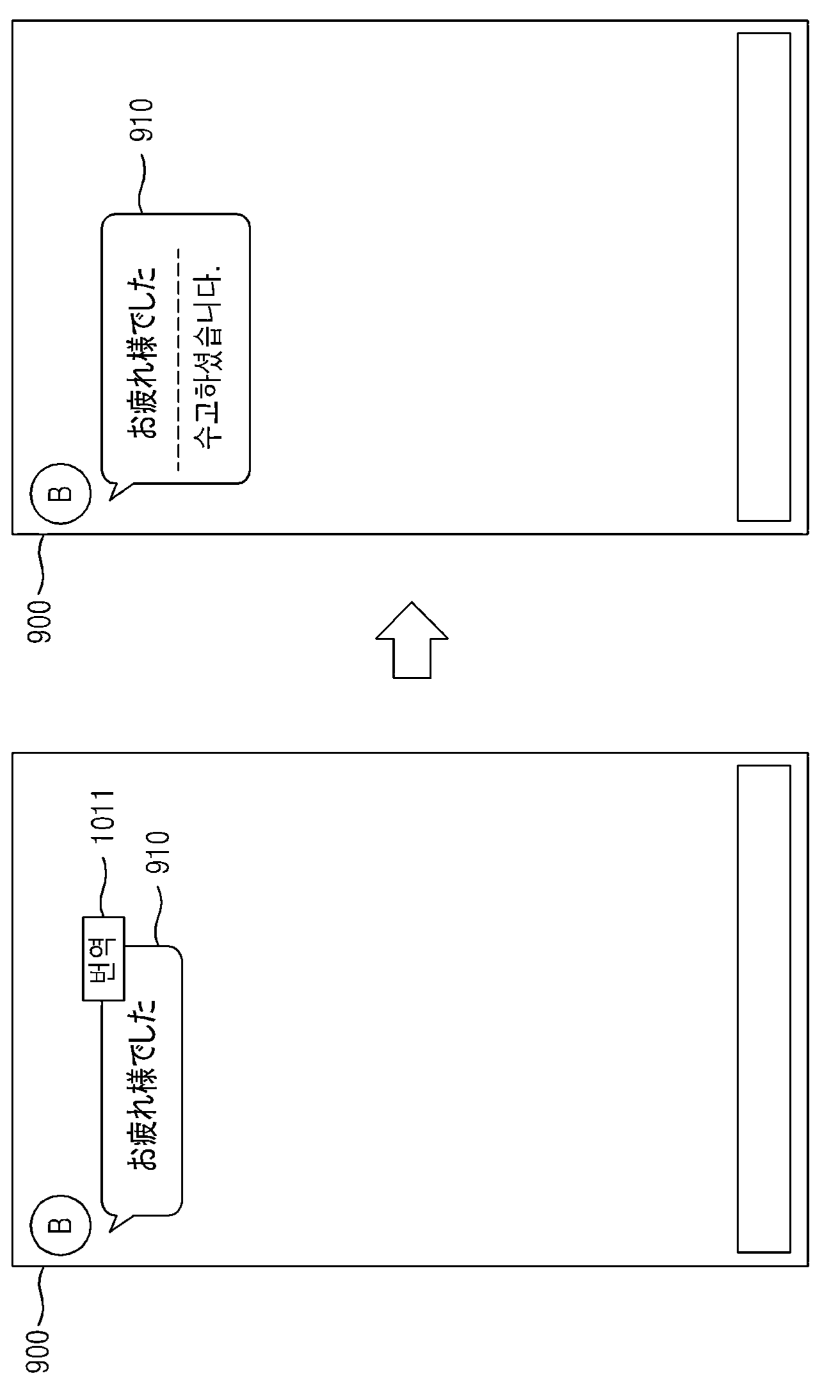
Figure 11:
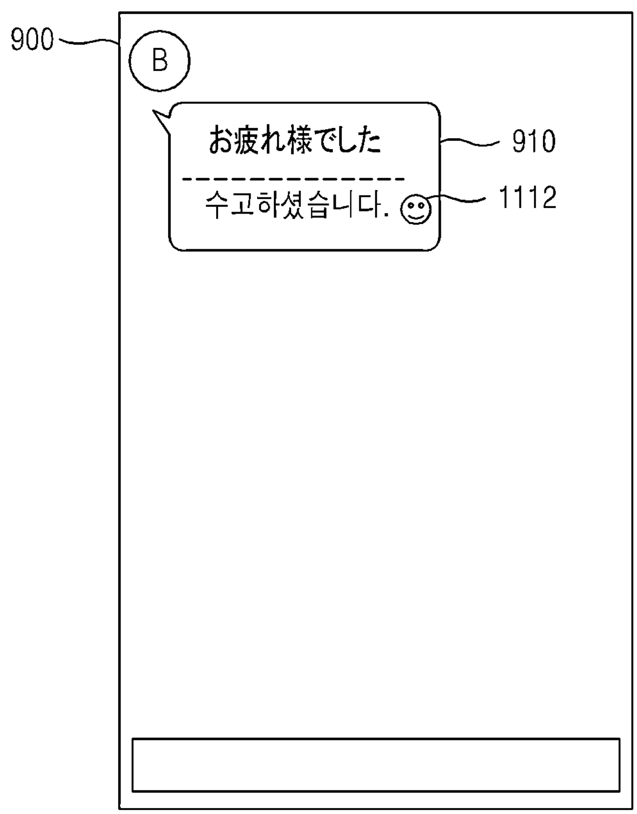
Figure 12:
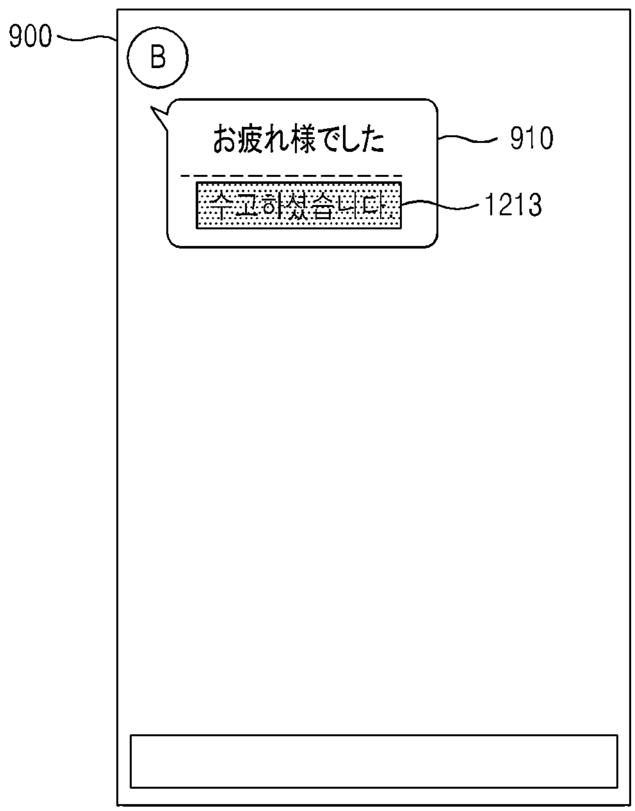
Figure 13:
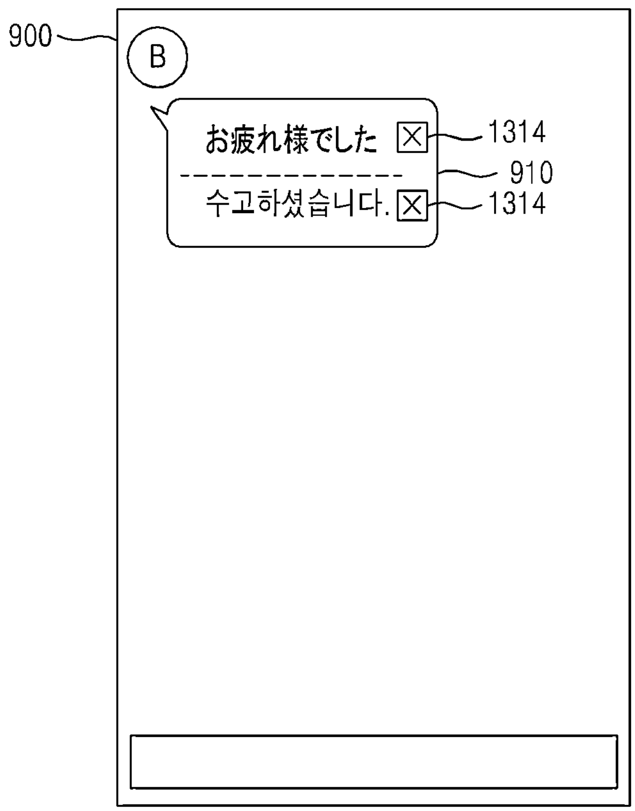

As another example, referring to FIG. 10, the message processing 330 may display the speech bubble interface 910 that includes the original text 'お疲れ様でした' of the message. Here, for a message in a language different from a user language, a "translation" menu 1011 for requesting a message translation may be activated and displayed together at a position adjacent to the speech bubble interface 910. According to some example embodiments, the "translation" menu 1011 may be displayed as an overlay on and/or adjacent to the speech bubble interface 910. At a point in time at which a user request is input, that is, when the "translation" menu 1011 is selected, the message processing 330 may display the translated text of the message in an inline view form. Here, the message processing 330 may add the translated text '수고하셨습니다' of the message to the speech bubble interface 910 and thereby display the same as a single message with the original text 'お疲れ様でした'.

In a process of displaying the original text 'お疲れ様でした' of the message and the translated text '수고하셨습니다' of the message through the single speech bubble interface 910, the message processing 330 may additionally display a display element for identifying at least one of the original text of the message and the translated text of the message. For example, referring to FIG. 11, the message processing 330 may distinguish the translated text of the message from the original text of the message by marking an indicator 1112 indicating the translated text in the translated text of the message between the original text of the message and the translated text of the message included in the speech bubble interface 910. According to some example embodiments, the indicator 1112 may be an icon, emoticon, symbol, label, etc. According to some example embodiments, the original text may be marked with the indicator 1112 without the translated text being marked, the translated text may be marked with the indicator 1112 without the original text being marked, or the original text and translated text may be marked using different indicators 1112. As another example, referring to FIG. 12, the message processing 330 may distinguish the translated text of the message from the original text of the message by applying a highlight 1213 to the translated text of the message between the original text of the message and the translated text of the message included in the speech bubble interface 910. According to some example embodiments, the original text may be highlighted without the translated text being highlighted, the translated text may be highlighted without the original text being highlighted, or the original text and translated text may be highlighted using different colors.

Also, when displaying the original text お疲れ様でした of the message and the translated text 수고하셨습니다 of the message through the single speech bubble interface 910, the message processing 330 may provide a function of manipulating delete, correct, and/or hide processing for at least one of the original text of the message and/or the translated text of the message. For example, referring to FIG. 13, a 'delete' menu 1314 for deleting a message may be included for each of the original text of the message and/or the translated text of the message included in the speech bubble interface 910. For example, when the 'delete' menu 1314 linked to the original text of the message is selected in the conversation space 900, the original text of the message may be deleted and the translated text of the message alone may be displayed on the speech bubble interface 910. Since the original text of the message and the translated text of the message are processed as separate messages, individual manipulation such as delete, correct, and/or hide processing, may be applied. When the client or the server 150 provides the original text of the message and the translated text of the message, the client or the server may deliver the original text of the message and the translated text of the message by including the translated text of the message as additional information of the original text of the message or by including an identifier of the original text of the message in the translated text of the message. In this manner, individual processing may be performed.

Figure 14:
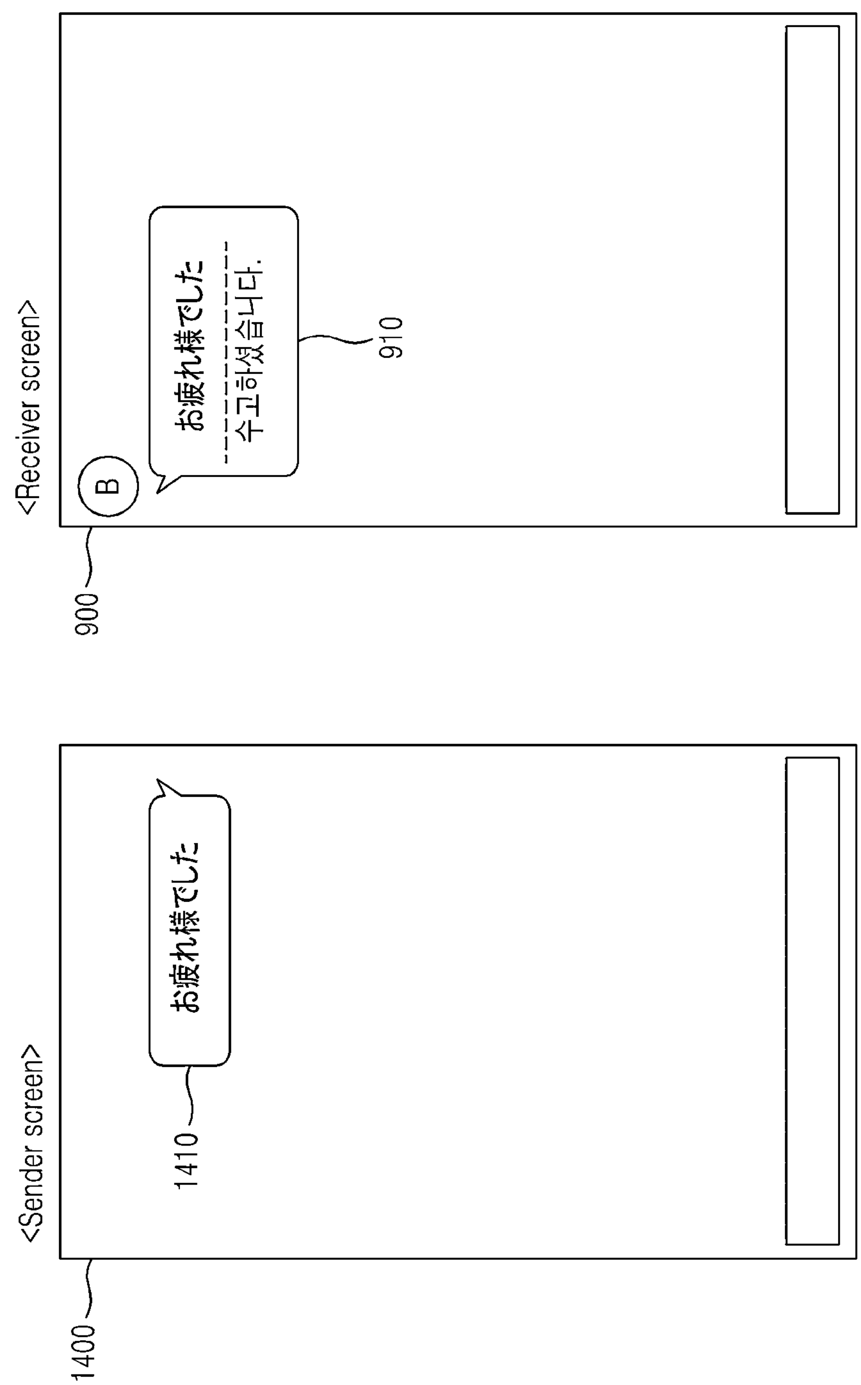

The translated text 수고하셨습니다 of the message for the original text 'お疲れ様でした' of the message may be displayed only for the user A and may not be displayed for the user B. When a language of an incoming message differs from a user language, the message processing 330 may display the original text of the message and the translated text of the message together. Referring to FIG. 14, a speech bubble interface 1410 including the original text お疲れ様でした of the message is displayed on a sender screen 1400 that is a conversation space of the user B sending the original text お疲れ様でした of the message, and the original text お疲れ様でした of the message and the translated text 수고하셨습니다 of the message are displayed through the speech bubble interface 910 on a receiver screen that is the conversation space 900 of the user A desiring (e.g., requesting) a translation of the original text お疲れ様でした of the message. Since the translated text is not delivered to a sender of the message or a counterpart of which a translation-related option differs from that of the user, excessive messages are not accumulated and the user's request for translation is not exposed to the counterpart.

Also, some example embodiments may provide an improved message input UX such that a user may directly send a message written in a language of a counterpart in a conversation space even without using a separate service. When a language of a message input from the user in the conversation space differs from a language of the counterpart participating in the corresponding conversation space, or when a translation is determined to be performed according to a translation-related option for the conversation space, the message processing 330 may provide a translation function for the input message.

Figure 15:
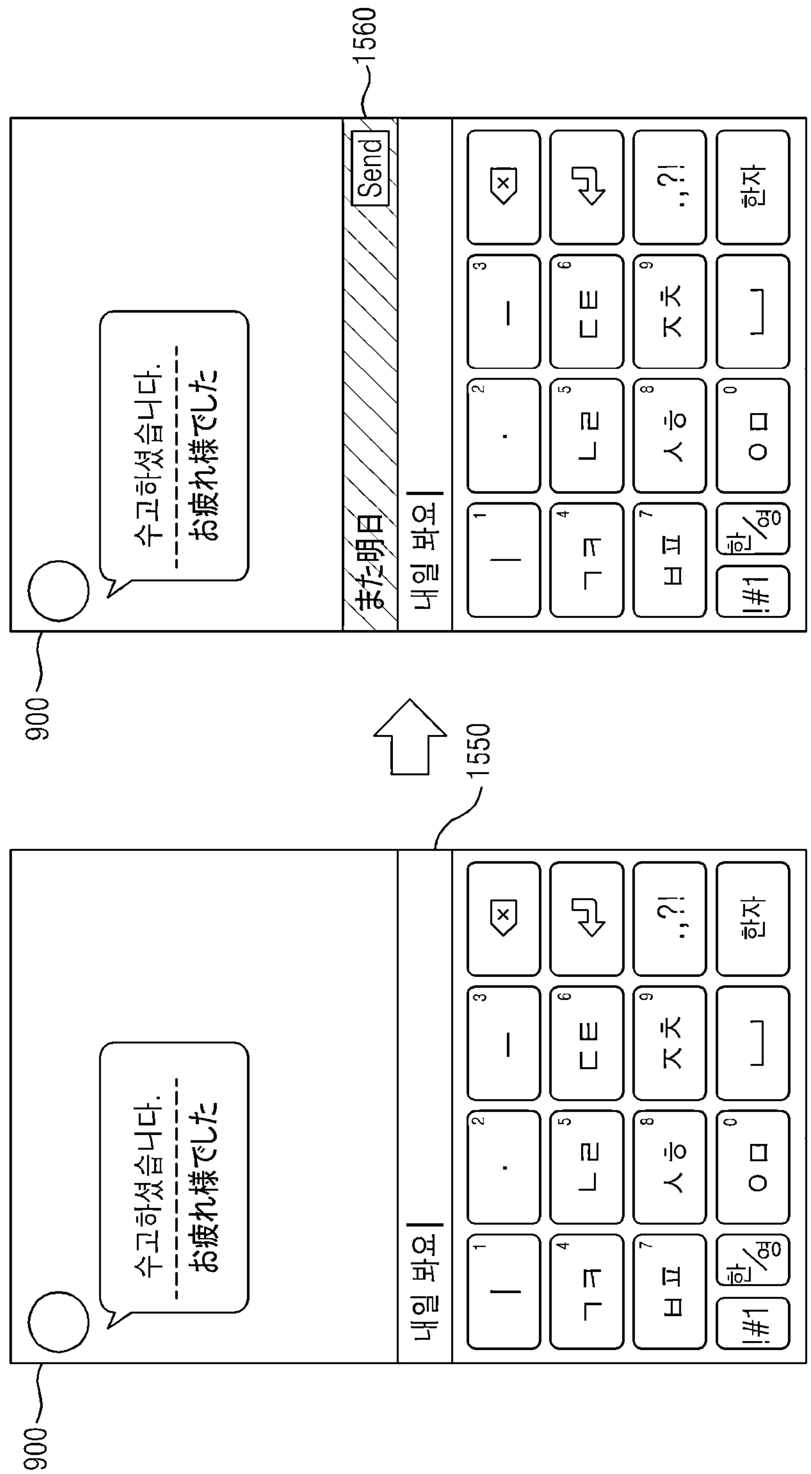

Referring to FIG. 15, when the user A inputs a message to be sent to the user B to a message input box 1550 in the conversation space 900, the message processing 330 may display a message translated in a language of the user B or a language designated by the user A through a message translation window 1560 that is an area adjacent to (e.g., above, below, aside of, overlaying, etc.) the message input box 1550 for the message input from the user A. Also, a translation for the input message may be performed by a translation bot participating in the conversation space 900 or the server 150, or may be performed by the client through an offline translation depending on some example embodiments. In response to a message send request from the user A, the message processing 330 may provide a function of sending a translated text displayed on the message translation window 1560 as is, or modifying and sending the same, instead of sending the message input to the message input box 1550.

Therefore, the message processing 330 may immediately (or promptly) send not the original text of the message, that is, the message input to the message input box 1550, but the message displayed on the message translation window 1560, that is, the message that is written in the language of the counterpart or the designated language.

According to some example embodiments, it is possible to recognize a user language and a language of an incoming message and to provide a translated text of the corresponding message in a conversation space according to the recognized language. Here, it is possible to combine and display an original text of the message and the translated text of the message through a single message user interface (UI) and to display the translated text of the message only for a user that desires a translation result based on a language used in the conversation space and/or a translation-related option. Also, in a process of inputting a message into a message input box of the conversation space, it is possible to provide a function of immediately (or promptly) sending not the original text but the translated text by providing the translated text.

The apparatuses described above may be implemented using hardware components, software components, and/or a combination thereof. For example, a processing device (e.g., processor) and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the median include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes some example embodiments, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A message processing method performed by a computer system being a client comprising at least one processor, the at least one processor being configured to execute computer-readable instructions included in a memory, the message processing method comprising:

recognizing, by the at least one processor, a language related to a conversation space based on a conversation context and a translation-related option to obtain a recognized language, the translation-related option being set for the conversation space;

receiving, from a server by the at least one processor, at least one translated text according to the recognized language for a message in the conversation space, the receiving including receiving an identifier of the message with the at least one translated text, and each of the at least one translated text being a language translation of an original text of the message;

combining, by the at least one processor, the at least one translated text with the message based on the identifier of the message; and displaying, by the at least one processor, a combination of the original text of the message and the at least one translated text on the conversation space as a single message based on the combining, wherein the displaying comprises displaying the combination of the original text of the message and the at least one translated text through a single speech bubble interface, the single speech bubble interface being configured to display entire message content of the original text as a single message including both the original text and the at least one translated text, and wherein the displaying comprises displaying, in the single speech bubble interface, a first manipulation interface configured to manipulate the original text and a second manipulation interface configured to manipulate the at least one translated text, and the original text and the at least one translated text are individually deletable, correctable, or hideable via the first manipulation interface and the second manipulation interface, respectively.

2. The message processing method of claim 1, wherein the recognizing comprises:

recognizing a user language used by a user of the computer system in the conversation space; and recognizing at least one recognition target language corresponding to the translation-related option among languages of incoming messages.

3. The message processing method of claim 1, wherein the at least one translated text is a result of translation of the message into at least one language;

the at least one language includes a first language used by a user of the computer system; and the receiving comprises receiving the at least one translated text based on a second language of the message being different from the first language.

4. The message processing method of claim 1, wherein the displaying comprises displaying a display element for identifying at least one of the original text or the at least one translated text, the display element distinguishing the original text and the at least one translated text.

5. The message processing method of claim 1, wherein the receiving comprises:

displaying the single speech bubble interface including the original text of the message on the conversation space, the message being received in the conversation space;

adding the at least one translated text of the message to the single speech bubble interface in response to a user request; and forming the single message including both the original text and the at least one translated text.

6. The message processing method of claim 3, wherein the at least one translated text is displayed by the computer system without being sent to another user included in the conversation space.

7. The message processing method of claim 3, further comprising:

obtaining the at least one translated text from a translation-only bot or the server, the translation-only bot being included in the conversation space, and the server being related to the conversation space.

8. The message processing method of claim 3, further comprising:

generating the at least one translated text using a translation library included in a local database of the computer system.

9. The message processing method of claim 1, wherein the conversation space includes a message display window and a message input box, the message input box being separate from the message display window;

the receiving includes receiving a result of translation into the recognized language for the message based on the message being input to the message input box by a user of the computer system;

the message processing method further comprises sending the result of translation to another user included in the conversation space in response to a message send request from the user without sending the message input to the message input box; and the displaying includes displaying the combination of the original text of the message and the at least one translated text on the message display window.

10. A non-transitory computer-readable record medium storing instructions that, when executed by at least one processor, cause a computer system including the at least one processor to implement the message processing method of claim 1.

11. A computer system being a client, comprising:

at least one processor configured to execute computer-readable instructions included in a memory to cause the computer system to, recognize a language related to a conversation space based on a conversation context and a translation-related option to obtain a recognized language, the translation-related option being set for the conversation space, receive, from a server at least one translated text according to the recognized language for a message in the conversation space, an identifier of the message being received with the at least one translated text, and each of the at least one translated text being a language translation of an original text of the message, combine the at least one translated text with the message based on the identifier of the message, and display a combination of the original text of the message and the at least one translated text on the conversation space as a single message based on the combination, wherein the at least one processor is configured to display the combination of the original text of the message and the at least one translated text through a single speech bubble interface, the single speech bubble interface being configured to display entire message content of the original text as a single message including both the original text and the at least one translated text, and wherein the at least one processor is configured to display, in the single speech bubble interface, a first manipulation interface configured to manipulate the original text and a second manipulation interface configured to manipulate the at least one translated text, and the original text and the at least one translated text are individually deletable, correctable, or hideable via the first manipulation interface and the second manipulation interface, respectively.

12. The computer system of claim 11, wherein the at least one processor is configured to cause the computer system to:

recognize a user language used by a user of the computer system in the conversation space; and recognize at least one recognition target language corresponding to the translation-related option among languages of incoming messages.

13. The computer system of claim 11, wherein the at least one translated text is a result of translation of the message into at least one language;

the at least one language includes a first language used by a user of the computer system; and the at least one processor is configured to cause the computer system to receive the at least one translated text based on a second language of the message being different from the first language.

14. The computer system of claim 11, wherein the at least one processor is configured to cause the computer system to:

display the single speech bubble interface including the original text of the message on the conversation space, the message being received in the conversation space;

add the at least one translated text of the message to the single speech bubble interface in response to a user request; and form the single message including both the original text and the at least one translated text.

15. The computer system of claim 13, wherein the at least one processor is configured to cause the computer system to obtain the at least one translated text from a translation-only bot or the server, the translation-only bot being included in the conversation space, and the server being related to the conversation space.

16. The computer system of claim 13, wherein the at least one processor is configured to cause the computer system to generate the at least one translated text using a translation library included in a local database in the memory.

17. The computer system of claim 11, wherein the conversation space includes a message display window and a message input box, the message input box being separate from the message display window; and the at least one processor is configured to cause the computer system to:

receive a result of translation into the recognized language for the message based on the message being input to the message input box of the conversation space by a user of the computer system, send the result of translation to another user included in the conversation space in response to a message send request from the user without sending the message input to the message input box, and display the combination of the original text of the message and the at least one translated text on the message display window.

18. The message processing method of claim 1, further comprising:

determining an association between the original text of the message and the at least one translated text based on the identifier of the message provided with the at least one translated text, wherein the combining includes combining the at least one translated text with the message based on the determining.

* * * * *